(12) United States Patent
Lee et al.

(10) Patent No.: US 9,154,527 B2
(45) Date of Patent: Oct. 6, 2015

(54) SECURITY KEY CREATION (75) Inventors: Kwai Yeung Lee, Pittsburg, CA (US);
William C. King, Lafayette, CA (US);
Priscilla Lau, Fremont, CA (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 207 days.

(21) Appl. No.: 13/412,141

(22) Filed: Mar. 5, 2012

(65) Prior Publication Data

US 2013/0003950 A1    Jan. 3, 2013

Related U.S. Application Data (63) Continuation-in-part of application No. 13/174,644, filed on Jun. 30, 2011.

(51) Int. Cl.
*H04M 11/00* (2006.01)
*H04L 29/06* (2006.01)

(52) U.S. Cl.
CPC .......... *H04L 65/1016* (2013.01); *H04L 63/061* (2013.01); *H04L 65/1073* (2013.01); *H04L 63/0435* (2013.01)

(58) Field of Classification Search
USPC ........ 379/93.02, 93.03, 221, 1; 380/279, 270, 380/257
See application file for complete search history.

(56) References Cited

U.S. PATENT DOCUMENTS

| | | | |
|---|---|---|---|
| 5,986,568 A | 11/1999 | Suzuki et al. | |
| 7,136,651 B2 | 11/2006 | Kalavade | |
| 7,386,878 B2 | 6/2008 | Fernando et al. | |
| 7,954,141 B2 | 5/2011 | De Lutiis et al. | |
| 8,230,035 B2 | 7/2012 | Morgan et al. | |
| 8,353,011 B2 | 1/2013 | Bajko et al. | |
| 2003/0177401 A1 | 9/2003 | Arnold et al. | |
| 2004/0145773 A1 | 7/2004 | Oakeson et al. | |
| 2008/0065891 A1 | 3/2008 | Karamchedu et al. | |
| 2008/0133761 A1* | 6/2008 | Polk | 709/228 |
| 2008/0307511 A1 | 12/2008 | Ahtisaari | |
| 2009/0063851 A1 | 3/2009 | Nijdam | |
| 2009/0067628 A1 | 3/2009 | Pudney et al. | |
| 2009/0089583 A1 | 4/2009 | Patel | |
| 2009/0094457 A1 | 4/2009 | Lapstun et al. | |
| 2009/0158034 A1 | 6/2009 | Gu et al. | |

(Continued)

OTHER PUBLICATIONS

3GPP Organizational Partners, "3GPP TS 33.110, $3^{rd}$ Generation Partnership Project; Technical Specification Group Services and System Aspects; Key Establishment between a Universal Integrated Circuit Card (UICC) and a terminal (Release 9)", V9.0.0, Dec. 2009, 28 pages.

(Continued)

*Primary Examiner* — Amal Zenati (57) ABSTRACT

A device may obtain calling security parameters, may communicate the calling security parameters to a network device, and may receive, from the network device, a calling parameters identifier associated with the calling security parameters. The device may communicate the calling parameters identifier to a called device, may receive a called parameters identifier from the called device, and may communicate the called parameters identifier to the network device. The device may receive called security parameters from the network device, may create a security key based on the calling security parameters and the called security parameters, and may communicate with the called device using the security key.

20 Claims, 8 Drawing Sheets

(56) References Cited

U.S. PATENT DOCUMENTS

| | | |
|---|---|---|
| 2009/0180614 A1 | 7/2009 | Rajagopal et al. |
| 2010/0030904 A1 | 2/2010 | Oda et al. |
| 2010/0054472 A1 | 3/2010 | Barany et al. |
| 2010/0153726 A1 | 6/2010 | Liu et al. |
| 2010/0268937 A1 | 10/2010 | Blom et al. |
| 2010/0273455 A1 | 10/2010 | Tamura et al. |
| 2011/0055565 A1 | 3/2011 | Murakami et al. |
| 2011/0091036 A1 | 4/2011 | Norrman et al. |
| 2011/0167272 A1 | 7/2011 | Kolesnikov |
| 2011/0185070 A1 | 7/2011 | Xue et al. |
| 2011/0206206 A1* | 8/2011 | Blom et al. ............ 380/279 |
| 2012/0027211 A1 | 2/2012 | Lehtovirta et al. |
| 2012/0109830 A1 | 5/2012 | Vogel |
| 2012/0204027 A1 | 8/2012 | Baek et al. |
| 2012/0311329 A1 | 12/2012 | Medina et al. |
| 2012/0322416 A1 | 12/2012 | Sundaram et al. |
| 2013/0024686 A1 | 1/2013 | Drucker |
| 2013/0060708 A1 | 3/2013 | Oskolkov et al. |
| 2013/0085880 A1 | 4/2013 | Roth et al. |
| 2013/0091556 A1 | 4/2013 | Horn et al. |
| 2013/0315389 A1 | 11/2013 | Jung et al. |

OTHER PUBLICATIONS

3GPP Organizational Partners, "3GPP TS 33.220, $3^{rd}$ Generation Partnership Project; Technical Specification Group Services and System Aspects; Generic Authentication Architecture (GAA); Generic bootstrapping architecture (Release 9)", V9.3.0, Jun. 2010, 75 pages.

3GPP Organizational Partners, "3GPP TS 33.401, $3^{rd}$ Generation Partnership Project; Technical Specification Group Services and System Aspects; 3GPP System Architecture Evolution (SAE); Security architecture (Release 9)", V9.6.0, Dec. 2010, 105 pages.

* cited by examiner

SECURITY KEY CREATION

RELATED APPLICATION

This application is a continuation-in-part of U.S. patent application Ser. No. 13/174,644, filed on Jun. 30, 2011. The entire content of U.S. patent application Ser. No. 13/174,644 is incorporated herein by reference.

BACKGROUND

Currently available network technologies include various solutions for attempting to ensure that communications between devices within a network are secure. For instance, some solutions include the use of security keys to encrypt and decrypt information that is communicated between devices. However, currently available network technologies are inadequate. For example, current solutions for generating security keys involve risky procedures, such as passing security keys between devices, require a prohibitive quantity of network resources, etc.

DETAILED DESCRIPTION OF PREFERRED EMBODIMENTS

The following detailed description refers to the accompanying drawings. The same labels and/or reference numbers in different drawings may identify the same or similar elements.

A system and/or method, described herein, may provide solutions to creating security keys. For example, client devices, such as mobile telephones, may each generate a security key based on parameters from a variety sources. Examples of such parameters may include information that results from an authentication process (e.g., a bootstrapping authentication process), information that is generated locally by each client device, information that is received from a network application server, etc. As such, the client devices may each create an identical security key for encryption and/or decryption purposes without ever having to communicate, to one another, the encryption key, a portion of the encryption key, and/or the set of parameters upon which the encryption key is based.

Accordingly, the system and/or method, described herein, may be used to enhance network performance by distributing the responsibility of creating security keys among client devices (as opposed to, for example, a centralized server). Additionally, or alternatively, since the security keys may be created by each client device locally, the system and/or method may enhance security by eliminating the transfer of security keys between client devices. Further, the system and/or method may also, or alternatively, enhance security by even eliminating the transfer of security key parameters between client devices.

Figure 1:
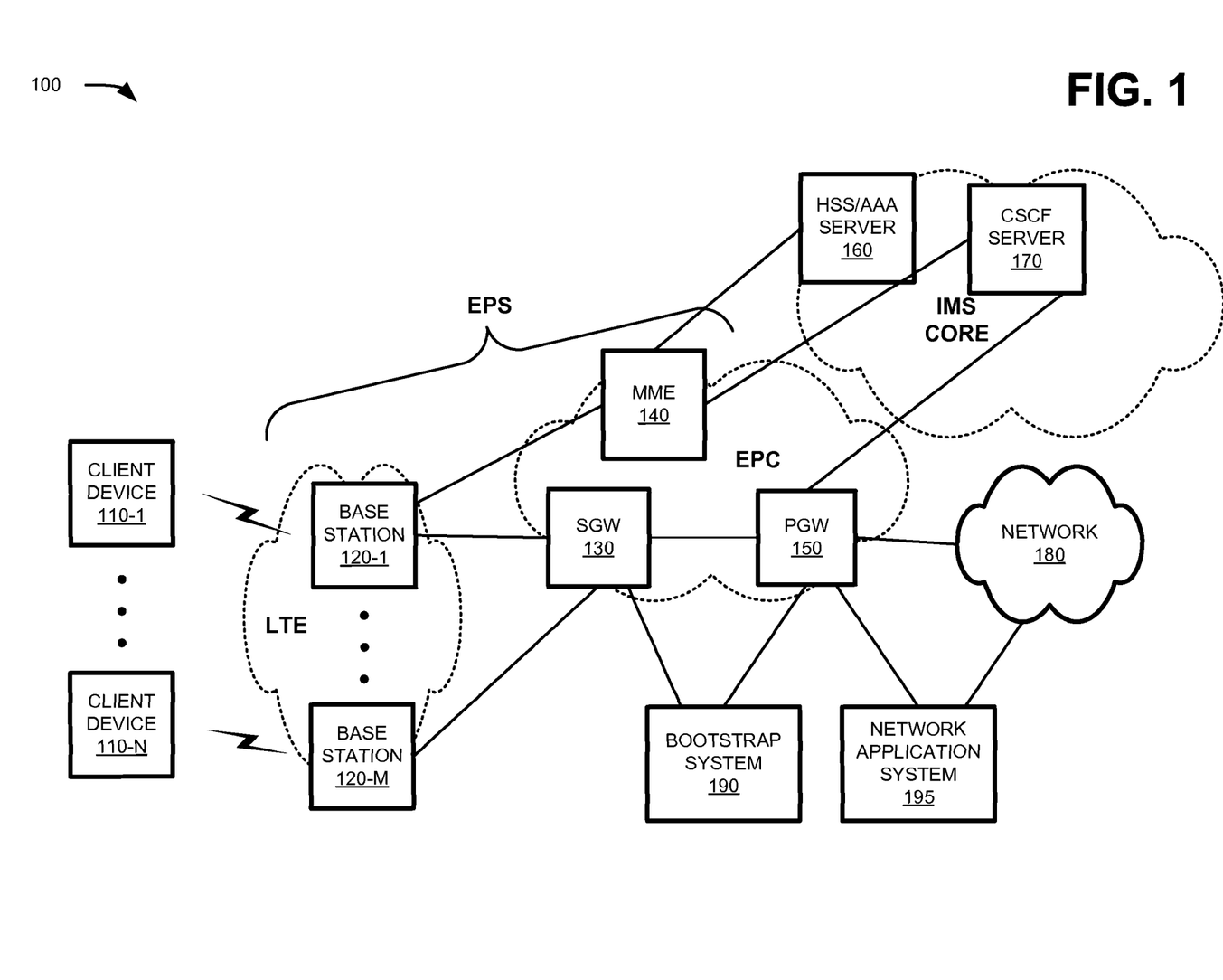
FIG. 1 is a diagram of an example environment in which systems and/or methods, described herein, may be implemented.

FIG. 1 is a diagram of an example environment 100 in which systems and/or methods, described herein, may be implemented. As shown in FIG. 1, environment 100 may include client devices 110-1, . . . , 110-N (where N≥1) (hereinafter referred to collectively as "client devices 110," and, in some instances, individually as "client device 110"), a group of base stations 120-1, . . . , 120-M (where M≥1) (hereinafter referred to collectively as "base stations 120," and, in some instances, individually as "base station 120"), a serving gateway 130 (hereinafter referred to as a "SGW 130"), a mobility management entity device 140 (hereinafter referred to as a "MME 140"), a packet data network (PDN) gateway 150 (hereinafter referred to as a "PGW 150"), a home subscriber server (HSS)/authentication, authorization, accounting (AAA) server 160 (hereinafter referred to as a "HSS/AAA server 160"), a call session control function (CSCF) server 170 (hereinafter referred to as a "CSCF server 170"), a network 180, a bootstrap system 190, and an application system 195.

The number of devices, systems, and/or networks, illustrated in FIG. 1, is provided for explanatory purposes only. In practice, there may be additional devices, systems, and/or networks, fewer devices, systems, and/or networks, different devices, systems, and/or networks, or differently arranged devices, systems, and/or networks than illustrated in FIG. 1.

Also, in some implementations, one or more of the devices or systems of environment 100 may perform one or more functions described as being performed by another one or more of the devices or systems of environment 100. Devices or systems of environment 100 may interconnect via wired connections, wireless connections, or a combination of wired and wireless connections.

Further, one or more implementations are described as being performed within a radio access network (RAN) that is based on a long term evolution (LTE) network for explanatory purposes. In other implementations, the implementations may be performed within a RAN that is not based on a LTE network.

Environment 100 may include an evolved packet system (EPS) that includes a LTE network and/or an evolved packet core (EPC) network that operate based on a third generation partnership project (3GPP) wireless communication standard. The LTE network may be a RAN that includes one or more base stations 120 that take the form of evolved Node Bs (eNBs) via which client device 110 communicates with the EPC network. The EPC network may include SGW 130, MME 140, and/or PGW 150 that enable client device 110 to communicate with network 180 and/or an Internet protocol (IP) multimedia subsystem (IMS) core network. The IMS core network may include HSS/AAA server 160 and/or CSCF server 170 and may manage authentication, session initiation, account information, profile information, etc. associated with client devices 110.

Client device 110 may include any computing device, such as a wireless mobile computation and communication device that is capable of communicating with base station 220 and/or a network (e.g., network 180). For example, client device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation and communication device. Client device 110 may send traffic to and/or receive traffic from network 180.

Base station 120 may include one or more devices that receive, process, and/or transmit traffic, such as audio, video, text, and/or other data, destined for and/or received from client device 110. In an example implementation, base station 120 may be an eNB associated with the LTE network that receives traffic from and/or sends traffic to network 180 via SGW 130 and PGW 150. Base station 120 may send traffic to and/or receive traffic from client device 110 via an air interface. Alternatively, or additionally, one or more other base stations 120 may be associated with a RAN that is not associated with the LTE network.

SGW 130 may include one or more computation and communication devices that gather, process, search, store, and/or provide information in a manner described herein. For example, SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 130 may aggregate traffic received from one or more base stations 120 associated with the LTE network, and may send the aggregated traffic to network 180 (e.g., via PGW 150) and/or other network devices associated with the IMS core network and/or the EPC network. SGW 130 may also receive traffic from the other network devices and/or may send the received traffic to client device 110 via base station 120. SGW 130 may perform operations associated with handing off client device 110 from and/or to the LTE network.

MME 140 may include one or more devices that gather, process, search, store, and/or provide information in a manner described herein. For example, MME 140 may perform operations associated with handing off client device 110, from a first base station 120 to a second base station 120, when client device 110 is exiting a cell associated with the first base station 120. Alternatively, or additionally, MME 140 may perform an operation to handoff client device 110 from the second base station 120 to the first base station 120 when client device 110 is entering the cell associated with first base station 120.

PGW 150 may include one or more devices that gather, process, search, store, and/or provide information in a manner described herein. For example, PGW 150 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 150 may include a device that aggregates traffic received from one or more SGWs 130, etc. and may send the aggregated traffic to network 180. Alternatively, or additionally, PGW 150 may receive traffic from network 180 and may send the traffic toward client device 110 via SGW 130.

HSS/AAA server 160 may include one or more server devices, or other types of computation and communication devices, that gather, process, search, store, and/or provide information in a manner described herein. For example, HSS/AAA server 160 may manage, update, and/or store, in a memory associated with HSS/AAA server 160, profile information associated with client device 110 that identifies applications and/or services that are permitted for and/or accessible by client device 110, information associated with a user of client device 110 (e.g., a username, a password, a personal identification number (PIN), etc.), rate information, minutes allowed, and/or other information. Additionally, or alternatively, HSS/AAA server 160 may include a device that performs AAA operations associated with a communication session with client device 110.

CSCF server 170 may include one or more server devices, or other types of computation and communication devices, that gather, process, search, store, and/or provide information in a manner described herein. CSCF server 170 may process and/or route calls to and from client device 110 via the EPC network. For example, CSCF server 170 may process calls, received from network 180, that are destined for client device 110. Alternatively, or additionally, CSCF server 170 may process calls, received from client device 110, that are destined for network 180.

Network 180 may include one or more wired and/or wireless networks. For example, network 180 may include a cellular network, a public land mobile network (PLMN), a second generation (2G) network, a third generation (3G) network, a fourth generation (4G) network, a fifth generation (5G) network, and/or another network. Additionally, or alternatively, network 180 may include a wide area network (WAN), a metropolitan area network (MAN), a telephone network (e.g., the Public Switched Telephone Network (PSTN)), an ad hoc network, an intranet, the Internet, a fiber optic-based network, a backhaul and/or management network, a voice over IP (VoIP) network, and/or a combination of these or other types of networks.

Bootstrap system 190 may include one or more types of computing devices. For example, bootstrap system 190 may include a server, a cluster of servers, or one or more other types of computing devices. Bootstrap system 190 may be capable of functioning in accordance with any of the implementations described herein. For instance, bootstrap system 190 may include a network server capable of providing one or more types of authentication services. In one example, bootstrap system 190 may include a bootstrapping server function (BSF) that provides application-specific, authentication services for communications between client device 110 and application system 195. Depending on the implementation, bootstrap system 190 may include, or be part of, any type of generic bootstrapping architecture (GBA) and/or any type of generic authentication architecture (GAA).

Application system 195 may include one or more types of computing devices. For example, application system 195 may include a server, a cluster of servers, or one or more other types of computing devices. Application system 195 may be capable of functioning in accordance with any of the implementations described herein. For instance, application system 195 may include a network application function (NAF) server that provides or enables a network service. In one example, application system 195 may enable client devices 110 to download a VoIP application (or another type of communication application), and/or use the VoIP application to communicate with one another via VoIP services.

While implementations herein are described primarily in the context of broadband services via a LTE network, other wireless standards may be used. For example, components conforming to LTE standards described herein may be replaced by components conforming to other network standards, such as, for example, Global System for Mobile Communications (GSM), Wideband Code Division Multiple Access (WCDMA), Universal Mobile Telecommunications System (UMTS), Code Division Multiple Access 2000 (CDMA2000), High Speed Packet Access (HSPA), 802.11, or other network standards.

Figure 2:
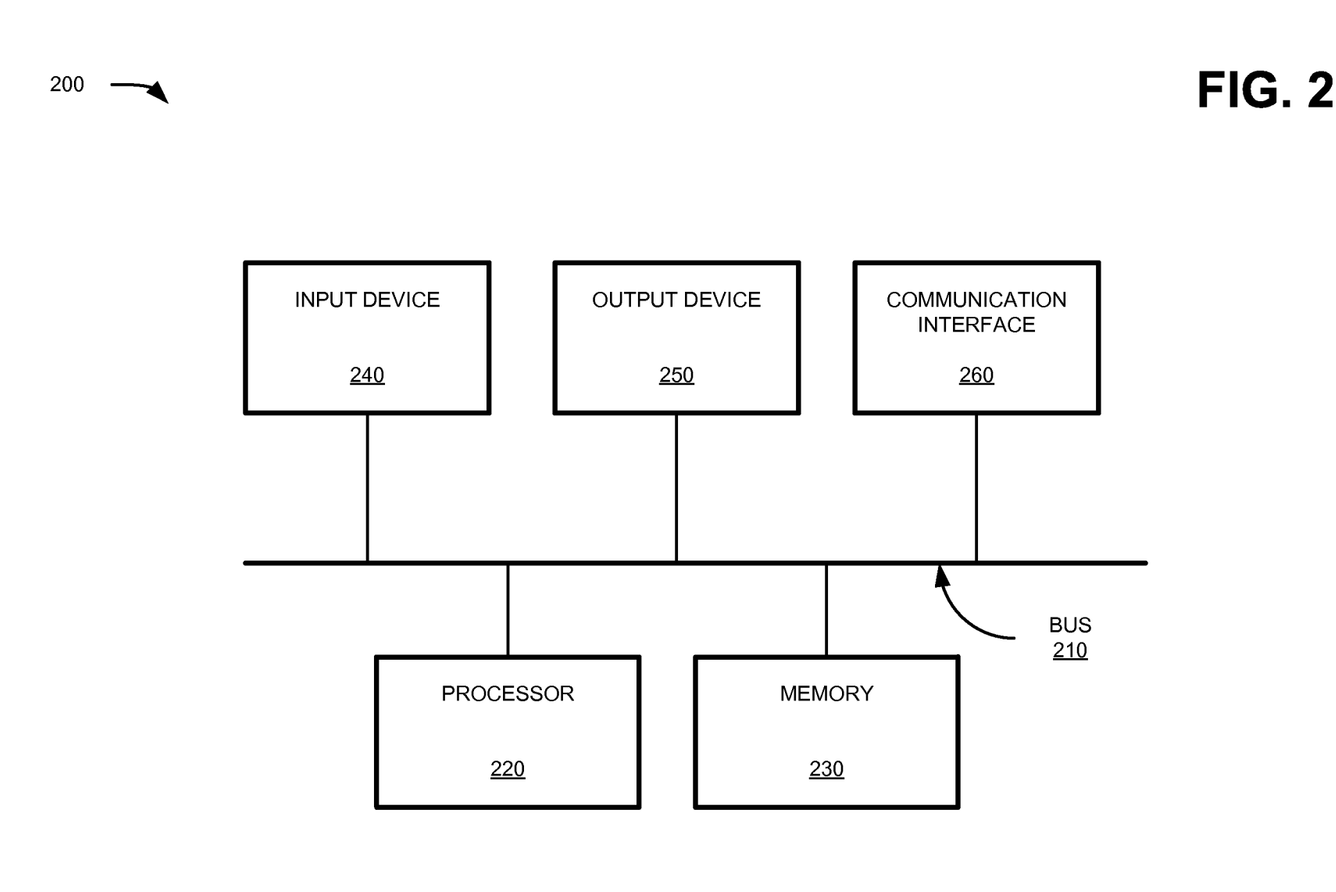
FIG. 2 is a diagram of an example of a device of FIG. 1.

FIG. 2 is a diagram of example components of device 200 that may be used within environment of FIG. 1. For example, device 200 may correspond to client device 110, base station 120, SGW 130, MME 140, PGW 150, HSS/AAA server 160, CSCF server 170, bootstrap system 190, and/or application system 195. Each of client device 110, base station 120, SGW 130, MME 140, PGW 150, HSS/AAA server 160, CSCF server 170, bootstrap system 190, and/or application system 195 may include one or more devices 200 and/or one or more of the components of device 200.

As depicted, device 200 may include a bus 210, a processor 220, memory 230, an input device 240, an output device 250, and a communication interface 260. However, the precise components of device 200 may vary between implementations. For example, depending on the implementation, device 200 may include fewer components, additional components, different components, or differently arranged components than those illustrated in FIG. 2.

Bus 210 may permit communication among the components of device 200. Processor 220 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processor 220 may control the overall operation, or a portion thereof, of device 200, based on, for example, an operating system (not illustrated) and/or various applications. Processor 220 may access instructions from memory 230, from other components of device 200, or from a source external to device 200 (e.g., a network or another device).

Memory 230 may include memory and/or secondary storage. For example, memory 230 may include random access memory (RAM), dynamic RAM (DRAM), read-only memory (ROM), programmable ROM (PROM), flash memory, or some other type of memory. Memory 230 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 240 may include one or more components that permit a user to input information into device 200. For example, input device 240 may include a keypad, a button, a switch, a knob, fingerprint recognition logic, retinal scan logic, a web cam, voice recognition logic, a touchpad, an input port, a microphone, a display, or some other type of input component. Output device 250 may include one or more components that permit device 200 to output information to a user. For example, output device 250 may include a display, light-emitting diodes (LEDs), an output port, a speaker, or some other type of output component.

Communication interface 260 may include one or more components that permit device 200 to communicate with other devices or networks. For example, communication interface 260 may include some type of wireless or wired interface. Communication interface 230 may also include an antenna (or a set of antennas) that permit wireless communication, such as the transmission and reception of radio frequency (RF) signals.

As described herein, device 200 may perform certain operations in response to processor 220 executing software instructions contained in a computer-readable medium, such as memory 230. The software instructions may be read into memory 230 from another computer-readable medium or from another device via communication interface 260. The software instructions contained in memory 230 may cause processor 220 to perform one or more processes described herein. Alternatively, hardwired circuitry may be used in place of, or in combination with, software instructions to implement processes described herein. Thus, implementations described herein are not limited to any specific combination of hardware circuitry and software.

Figure 3:
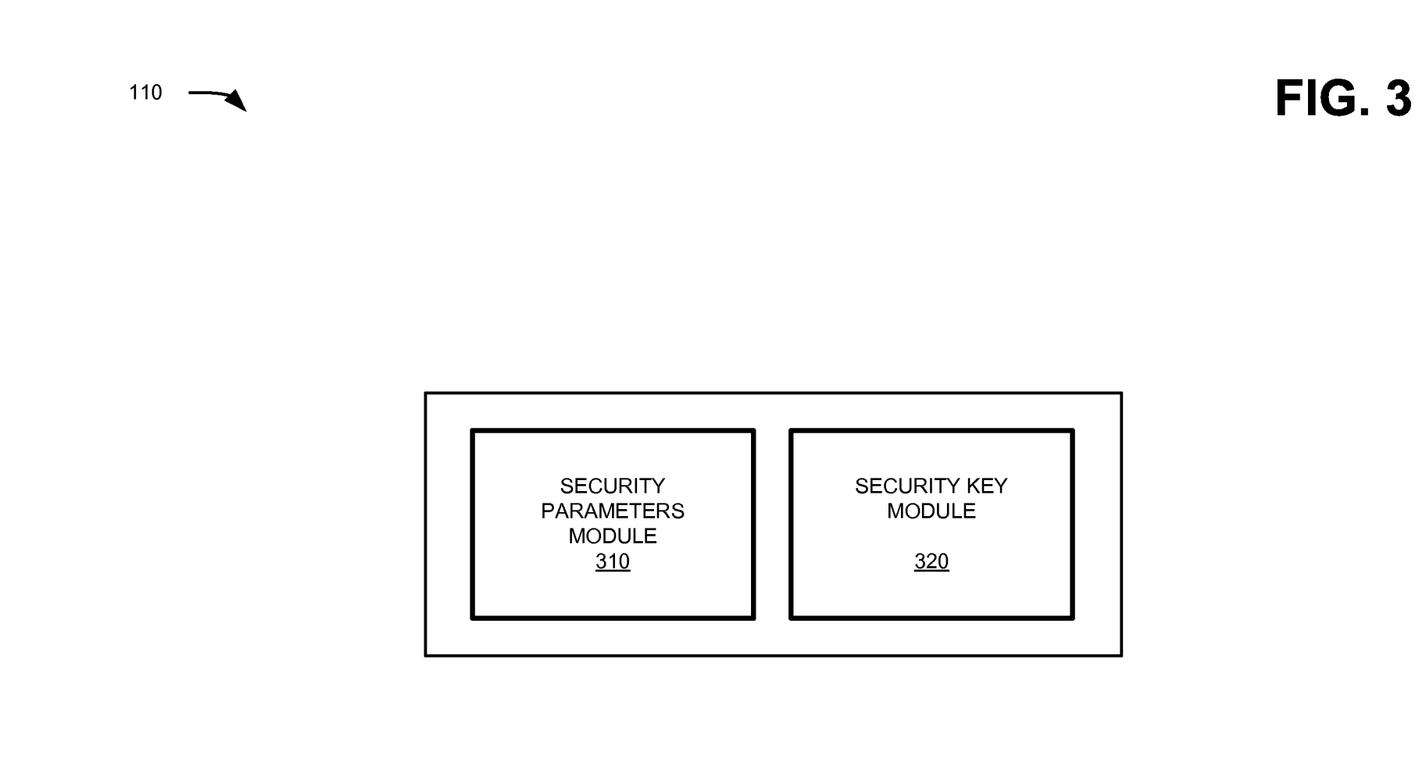
FIG. 3 is a diagram of an example client device according to one or more implementations described herein.

FIG. 3 is a diagram of example functional components of client device 110 according to one or more implementations described herein. As illustrated, client device 110 may include a security parameters module 310 and a security key module 320. Depending on the implementation, one or more of modules 310-320 may be implemented as a combination of hardware and software based on the components illustrated and described with respect to FIG. 2. Alternatively, modules 310-320 may each be implemented as hardware based on the components illustrated and described with respect to FIG. 2.

Security parameters module 310 may provide functionality with respect to security parameters. For example, security parameters module 310 may enable client device 110 to obtain security parameters from one or more of a variety of sources. For instance, security parameters module 310 may enable client device 110 to obtain security parameters from one or more authentication and/or authorization processes (involving, for example, HHS/AAA server 160, bootstrap system 190, network application system 195, etc.), from one or more operations that are performed locally, and/or by communicating with a network device, such as application system 195. Examples of security parameters may include a network application function (NAF) identifier (e.g., a NAF_ID), a bootstrapping transaction identifier (B-TID), a NAF key (e.g., an external NAF key, Ks_ext_NAF, etc.), an identifier of the device making the call (e.g., a CALLING_ID), an identifier of the device receiving the call (e.g., a CALLED_ID), etc.

Security key module 320 may provide functionality with respect to security keys 110. For example, security key module 320 may enable client device 110 to produce, generate, or otherwise create a security key for encrypting and/or decrypting communications that involve another client device 110. For instance, in one example, security key module 320 may create the security key based on one or more of the security parameters obtained by security parameters module 310. As such, while the security key may be capable of encrypting and/or decrypting communications involving another client device 110, client device 110 may be capable of creating the security key by using security parameters that are obtained or derived from sources other than the other client device 110.

In addition to the functionality described above, functional components of client device 110 may also, or alternatively, provide functionality as described elsewhere in this specification. Further, while FIG. 3 shows a particular number and arrangement of modules, in alternative implementations, client device 110 may include additional modules, fewer modules, different modules, or differently arranged modules than those depicted. For example, client device 110 may include an applications module that enables client device 110 to download and execute software applications, including a VoIP application or another type of communications-oriented software application.

Figure 4:
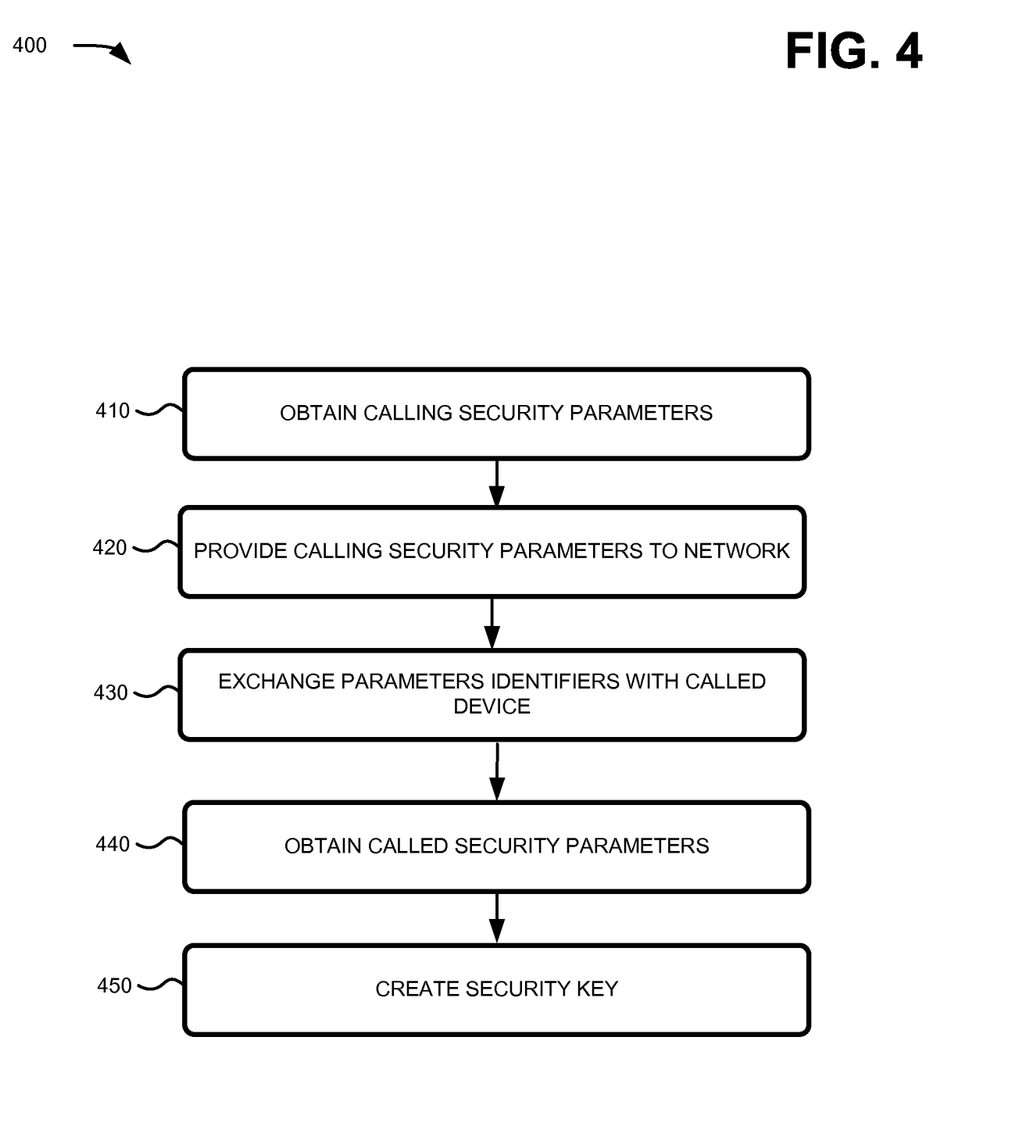
FIG. 4 is a diagram illustrating an example process for creating a security key according to one or more implementations described herein.

FIG. 4 is diagrams illustrating an example process 400 for creating security keys according to one or more implementations described herein. In one example, process 400 may be performed by one or more components of client device 110. Alternatively, or additionally, some or all of process 400 may be performed by one or more other components/devices, or a group of components/devices, including or excluding client device 110.

The description provided below makes reference to calling device 110 and called device 110. Each of calling device 110 and called device 110 may include examples of client device 110. For instance, calling device 110 may include a particular client device 110 that is being used to call or otherwise initiate communications with another client device 110. Similarly, called device 110 may include a particular client device 110 that is being called by, or is otherwise receiving communications from, calling device 110.

The description provided below also makes reference calling security parameters and called security parameters. Each of the calling security parameters and the called security parameters may include one or more types of security parameters as described herein. For instance, the calling security parameters may include security parameters that are provided to application system 195 by calling device 110. Similarly, the called security parameters may include security parameters provided to application system 195 by called device 110.

Process 400 may include obtaining calling security parameters (block 410). For example, calling device 110 may obtain calling security parameters from one or more of a variety of sources. In one example, calling device 110 may obtain calling security parameters from information that is stored locally by calling device 110. Calling device 110 may also, or alternatively, obtain calling security parameters via an authentication and/or authorization process involving a network device, such as bootstrap system 190, network application system 195, etc. Additionally, or alternatively, calling device 110 may obtain calling security parameters by executing one or more operations that are based on information stored by calling device 110 or information received from another device (e.g., bootstrap system 190, network application system 195, etc.

As illustrated in FIG. 4, process 400 may include providing calling security parameters to a network (block 420). For instance, calling device 110 may communicate the calling security parameters to network application system 195. In some implementations, calling device 110 may also provide additional information to network application system 195, such as a calling device identifier (e.g., a telephone number associated with calling device 110, a network identifier associated with calling device 110, etc.), a called device identifier (e.g., a telephone number associated with called device 110, a network identifier associated with called device 110, etc.), and/or a call or other type of communication session between calling device 110 and called device 110.

Process 400 may also include exchanging parameter identifiers with called device (block 430). For example, calling device 110 may receive a calling parameters identifier from network application system 195. Calling device 110 may provide the calling parameters identifier to called device 110, and called device 110 may respond by providing a called parameters identifier to calling device 110. The calling parameters identifier may include identification information associated with the calling security parameters, the calling device identifier, the called device identifier, etc. Similarly, the called parameters identifier may include identification information corresponding to called parameters identifier or other types of information associated with called device 110.

As illustrated in FIG. 4, process 400 may include obtaining called security parameters (block 440). For instance, calling device 110 may communicate with network application system 195 to retrieve called security parameters. In some implementations, calling device 110 may obtain the called security parameters by communicating the called parameters identifier to network application system 195.

Process 400 may also include creating a security key (block 450). For example, calling device 110 may produce a security key based on one or more of the types of information generated, received, or otherwise obtained by calling device 110. In some implementations, calling device 110 may create the security key based on some or all of the calling security parameters and the called security parameters. As mentioned above, the security key may enable calling device 110 to communicate with called device 110 in a secure manner (e.g., by enable calling device 110 to encrypt and decrypt communications to and from called device 110). Accordingly, calling device 110 may be capable of creating a security key without ever having to communicate the security key, or the security parameters used to generate the security key, to called device 110.

While FIG. 4 shows a flowchart diagram of an example process 400 for creating a security key, in other implementations, a process for creating a security key may include fewer operations, different operations, differently arranged operations, or additional operations than depicted in FIG. 4. For example, in some implementations, a process for creating a security key may include calling device 110 communicating the calling parameters identifier to a network device, such as network applications system 195, and the network device communicating the calling parameters identifier to called device 110. Additionally, or alternatively, two or more of the operations, described above, may be implemented in parallel.

Figure 5:
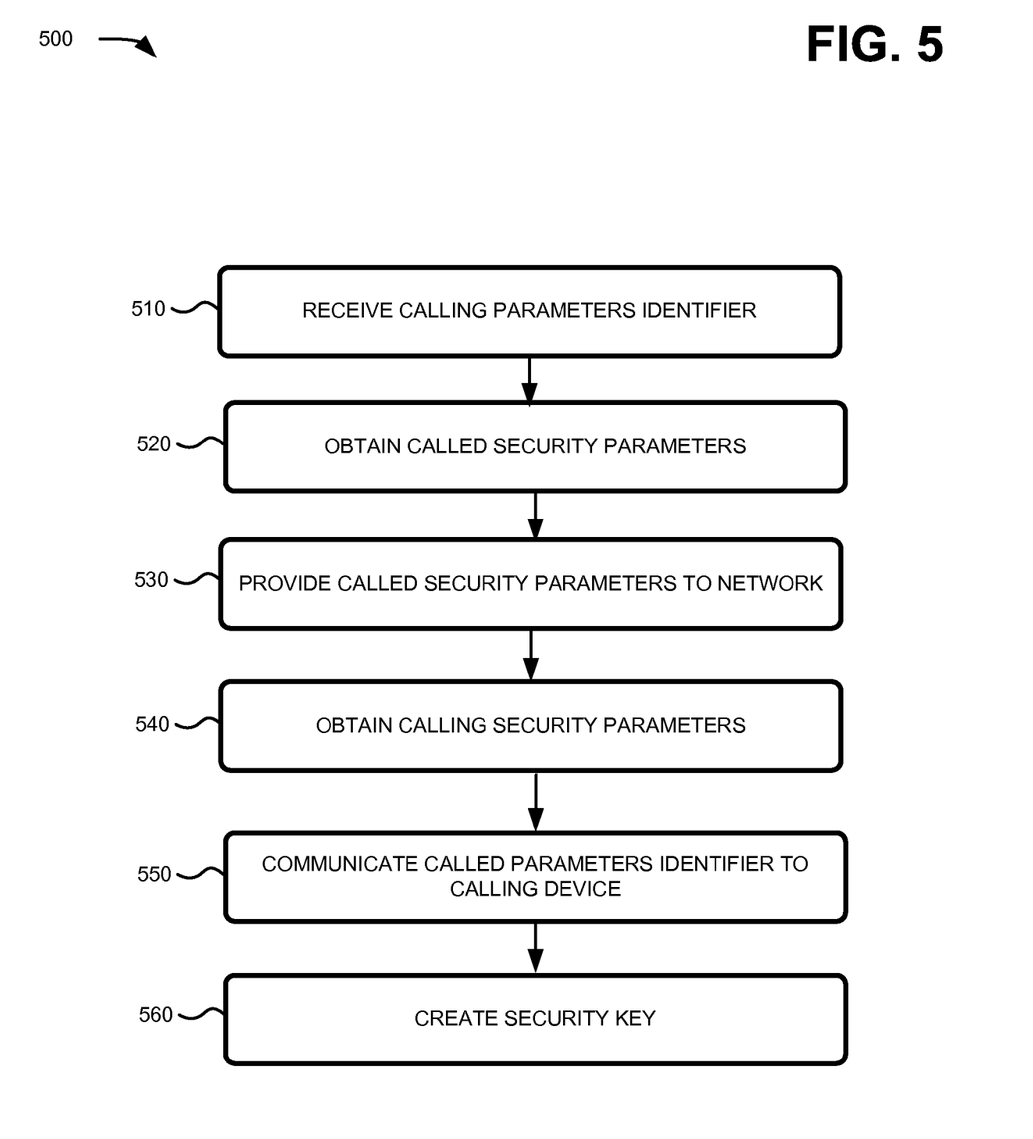
FIG. 5 is a diagram illustrating another example process for creating a security key according to one or more implementations described herein.

FIG. 5 is diagram illustrating another example process 500 for creating security keys according to one or more implementations described herein. In one example, process 500 may be performed by one or more components of client device 110. Alternatively, or additionally, some or all of process 500 may be performed by one or more other components/devices, or a group of components/devices, including or excluding client device 110.

Each of FIG. 4 and FIG. 5 includes example processes for creating a security key. Process 400 of FIG. 4 is described from the perspective of calling device 110, and process 500 of FIG. 500 is described from the perspective of called device 110. As such, as described below, process 500 may include operations that are similar to, or otherwise complementary to, one or more of the operation discussed above with reference to FIG. 4.

As illustrated in FIG. 5, process 500 may include receiving a calling parameters identifier (block 510). For example, called device 110 may receive a calling parameters identifier from calling device 110. In some implementations, called device 110 may receive the calling parameters identifier as part of an attempt from calling device 110 to establish a telephone call or another type of communication session with called device 110. As mentioned above, the calling parameters identifier may be associated with calling security parameters that are stored by application system 195.

Process 500 may include obtaining called security parameters (block 520). For example, called device 110 may obtain called security parameters from one or more of a variety of sources. In some implementations, called device 110 may obtain called security parameters from information that is stored locally by called device 110. Called device 110 may also, or alternatively, obtain called security parameters via an authentication and/or authorization process involving a network device, such as bootstrap system 190, network application system 195, etc. Additionally, or alternatively, called device 110 may obtain called security parameters by executing one or more operations that are based on information stored by called device 110 or information received from another device (e.g., bootstrap system 190, network application system 195, etc.).

Process 500 may also include providing called security parameters to a network (block 530). For instance, called device 110 may communicate the called security parameters to network application system 195. In some implementations, called device 110 may also provide additional information to network application system 195, such as a calling device identifier, a called device identifier, or another type of information relating to calling device 110, called device 110, and/or a call or other type of communication session between calling device 110 and called device 110. As described in greater detail below, doing so may enable network application system 195 to ensure that the called security parameters are later provided to the proper client device 110 (e.g., calling device 110).

Process 500 may also include obtaining calling security parameters (block 540). For instance, called device 110 may communicate with network application system 195 to retrieve calling security parameters. In some implementations, called device 110 may obtain the calling security parameters by communicating the calling parameters identifier to network application system 195. Additionally, or alternatively, called device 110 may obtain the calling security parameters by communicating a called device identifier (e.g., a telephone number of called device, etc.) or another type of information that network application system 195 may use in one or more of a variety of ways, such as identifying the calling security parameters, verifying that called device 110 is, in fact, the device that calling device 110 intends to contact, etc.

As depicted in FIG. 5, process 500 may include communicating a called parameters identifier to calling device 110 (block 550). For example, called device 110 may receive a calling parameters identifier from network application system 195 and/or may communicate the called parameters identifier to calling device 110. As mentioned above, the called parameters identifier may include identification information corresponding to the called parameters identifier or other types of information relating to called device 110. The called parameters identifier may enable calling device 110 to obtain the called security parameters from the network (e.g., network application system 195).

Process 500 may also include creating a security key (block 560). For example, called device 110 may produce a security key based on one or more of the types of information generated, received, or otherwise obtained by called device 110. In some implementations, called device 110 may create the security key based on the some or all of the called security parameters and the calling security parameters. As mentioned above, the security key may enable called device 110 to encrypt and decrypt communications to and from calling device 110. Accordingly, called device 110 may be capable of creating a security key without ever having to communicate the security key, or the security parameters used to generate the security key, to calling device 110.

While FIG. 5 shows a flowchart diagram of an example process 500 for creating a security key, in other implementations, a process for creating a security key may include fewer operations, different operations, differently arranged operations, or additional operations than depicted in FIG. 5. For example, in some implementations, a process for creating a security key may include called device 110 communicating the called parameters identifier to a network device, such as network applications system 195, and the network device communicating the called parameters identifier to calling device 110. Additionally, or alternatively, two or more of the operations, described above, may be implemented in parallel.

Figure 6A:
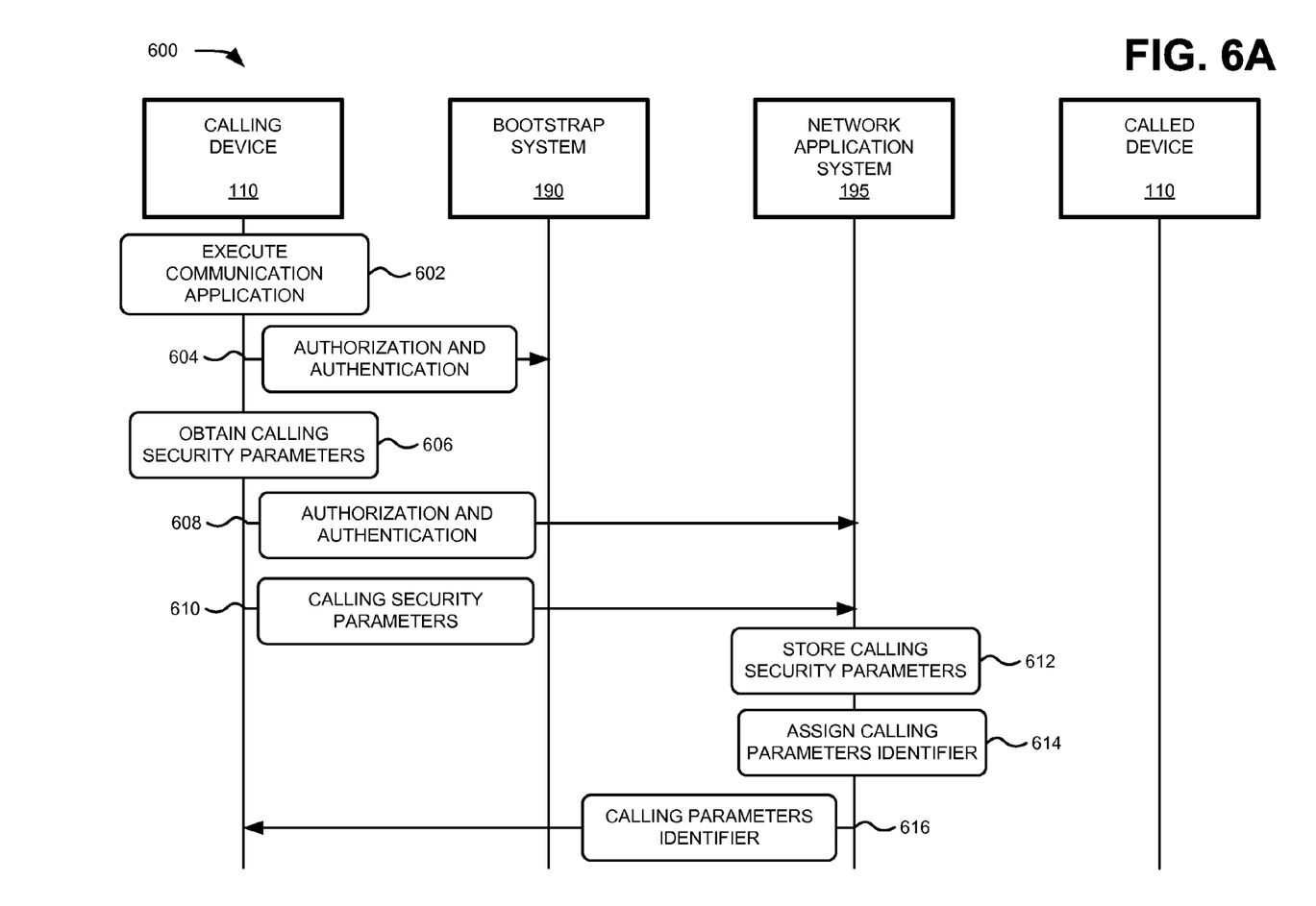
FIGS. 6A-6C are diagrams of example data flows for creating security keys according to one or more implementations described herein.
Figure 6B:
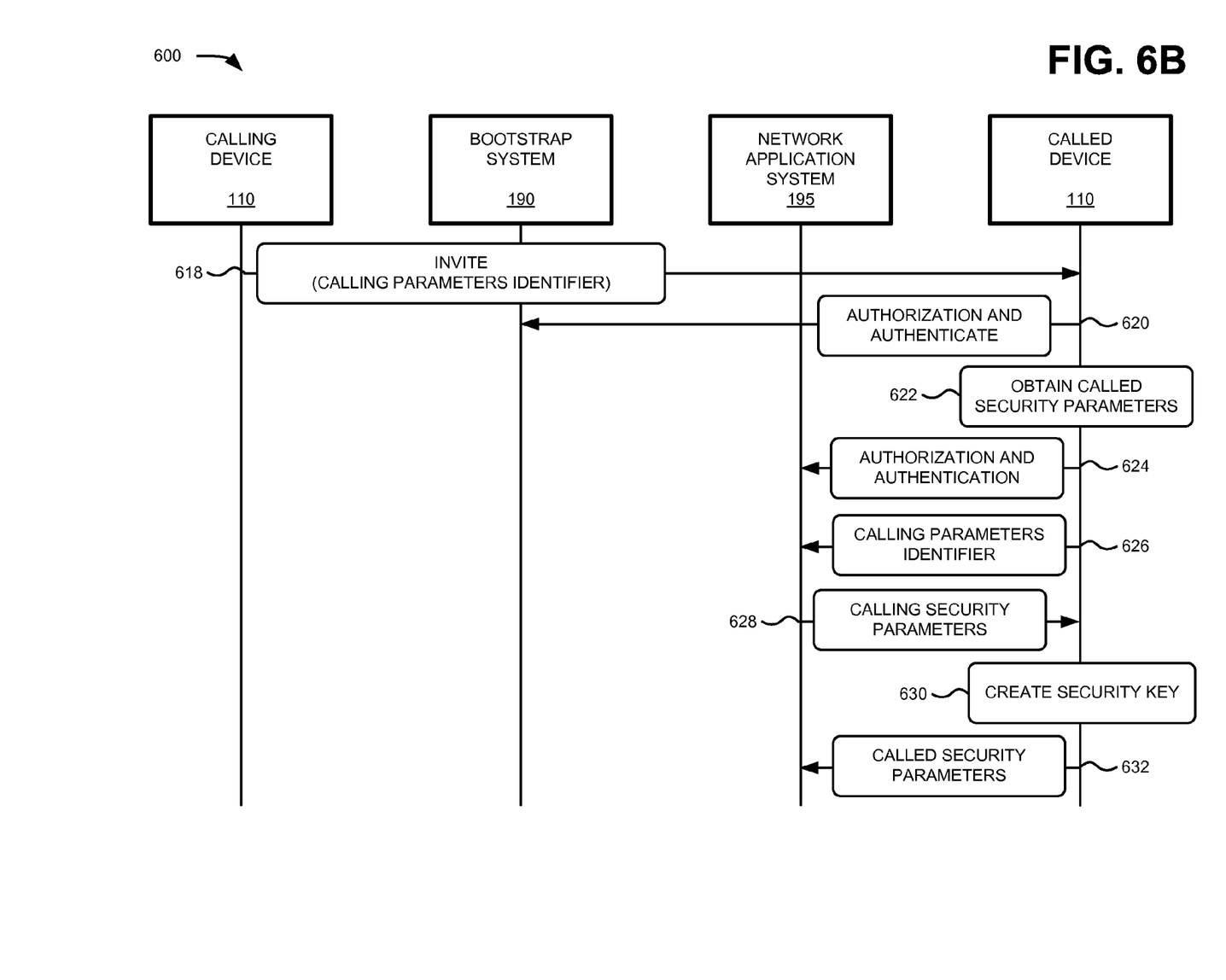
Figure 6C:
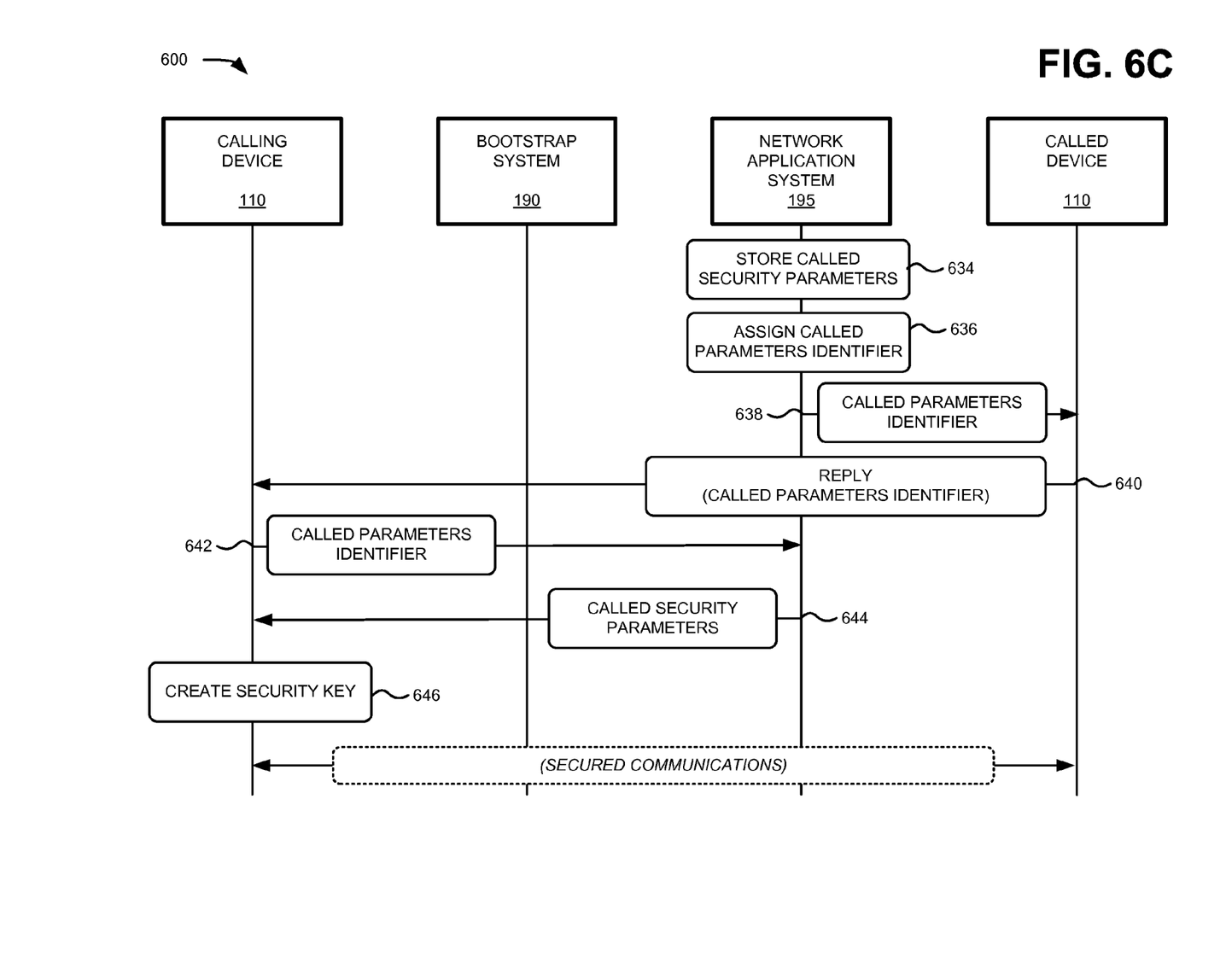

FIGS. 6A-6C are diagrams of an example data flow 600 for creating security keys according to one or more implementations described herein. As illustrated in FIGS. 6A-6C, data flow 600 may occur between calling device 110, called device 110, bootstrap system 190, and network application system 195.

As illustrated in FIG. 6A, calling device 110 may execute a communication application (block 602). For example, calling device 110 may execute a software application, such as a VoIP application, a video conferencing application, etc., that enables calling device 110 to contact called device 110 via a network, such as one or more of the networks described above with reference to FIG. 1. Additionally, or alternatively, calling device 110 may use another feature or component of calling device 110 (e.g., functionality made available via an operating system of calling device 110) to communicate with called device 110.

Calling device 110 may communicate with bootstrap system 190 to perform an authorization process and/or an authentication process with bootstrap system 190 (block 604). This may include calling device 110 communicating with a BSF or another type of authentication service made available by bootstrap system 190. For instance, calling device 110 may communicate with bootstrap system 190 to demonstrate that calling device 110 is capable of using a particular network to communicate using a service corresponding to the communication application.

As illustrated in FIG. 6A, calling device 110 may also obtain calling parameters (block 606), which may include information stored locally by calling device 110 and/or information received from authorizing and/or authenticating with bootstrap system 190. Calling device 110 may perform an authentication and/or authorization process involving network application system 195. For instance, calling device 110 may communicate with network application system 195 to demonstrate that calling device 110 is permitted to use the communication application (block 608). Calling device 110 may also, or alternatively, communicate the calling security parameters to network application system 195 (block 610). As mentioned above, calling device 110 may also, or alternatively, communicate one or more other types of information to network application system 195, such as a calling device identifier, a called device identifier, etc.

Network application system 195 may store the calling security parameters and/or other types information received from calling device 110 (block 612). In some implementations, network application system 195 may also, or alternatively, associate the calling security parameters with the called device identifier (e.g., the telephone number of called device 110). Network application system 195 may enhance security by ensuring that the calling security parameters are only communicated to called device 110. Network application system 195 may also assign a calling parameter identifier to the calling security parameters (block 614). Network application system 195 may communicate the assigned calling parameters identifier to calling device 110 (block 616).

Referring to FIG. 6B, calling device 110 may send a message, such as a session invitation protocol (SIP) INVITE message, to called device 110 (block 618). The message may invite called device 110 to establish a call or another type of communication session with called device 110. Additionally, or alternatively, the message may include the calling parameters identifier. Called device 110 may perform one or more authorization and/or authentication operations with bootstrap system 190 (block 620), which may be similar to the authorization and/or authentication operations executed by calling device 110. For instance, called device 110 may communicate with a BSF or another type of authentication service made available by bootstrap system 190.

Also, similar to calling device 110, called device 110 may obtain called security parameters (block 622), which may include information stored locally by called device 110 and/or information received from authorizing and/or authenticating with bootstrap system 190. Called device 110 may perform an authentication and/or authorization process involving network application system 195 (block 624). For instance, called device 110 may communicate with network application system 195 to demonstrate that called device 110 is permitted to use a communication application similar to the communication application being used by calling device 110. Called device 110 may also, or alternatively, communicate the calling parameters identifier 626 to network application system 195 (block 626), and network application system 195 may communicate the calling security parameters to called device 110 (block 628).

As further depicted in FIG. 6B, called device 110 may use the calling security parameters and the called security parameters to create a security key (block 630). Additionally, or alternatively, called device 110 may communicate the called security parameters to network application system 195 (block 632). As shown in FIG. 6C, network application system 195 may store the called security parameters (block 634), may assign a called parameters identifier to the store called security parameters (block 636), and may communicate the called parameters identifier to called device 110 (block 638).

As further shown in FIG. 6C, called device 110 may communicate a reply message to calling device 110 (block 640). The reply message may include a 200 OK message or another type of SIP message. The reply message may also include the called parameters identifier, which calling device 110 may communicate to network application system 195 (block 642). Network application system 195 may respond by providing calling device 110 with the called security parameters (block 644), and calling device 110 may use the called security parameters, along with the calling security parameters, to create a security key (block 646). As such, calling device 110 and called device 110 may use the newly created security keys to have secured communications between the calling device 110 and the called device 110 (block 648).

While FIGS. 6A-6C show an example data flow 600 that includes certain types of devices, systems, information, and/or operations, in other implementations, a data flow 600 for creating security keys may include fewer devices, systems, information, and/or operations, different devices, systems, information, and/or operations, differently arranged devices, systems, information, and/or operations, or additional devices, systems, information, and/or operations than depicted in FIGS. 6A-6C. Additionally, or alternatively, two or more of the operations, described above, may be implemented in parallel.

Systems and/or methods, described herein, may provide solutions to creating security keys. For example, client devices 110 may each generate a security key based on parameters from a variety sources, such as results from an authentication process (e.g., a bootstrapping authentication process), information that is generated locally by each client device 110, information that is received from a network application server, etc. As such, client devices 110 may each create a security key for encryption and/or decryption purposes without ever having to communicate to one another the encryption key or the parameters upon which the encryption key is based.

Systems and/or methods, described herein, may be used to enhance network performance by distributing the responsibility of creating security keys amongst client devices 110 (as opposed to, for example, a centralized server). Additionally, or alternatively, since the security keys may be created by each client device 110 locally, the systems and/or methods may enhance security by eliminating the transfer of security keys between client devices 110. Further, the systems and/or methods may also, or alternatively, enhance security by even eliminating the transfer of security key parameters between client devices.

The foregoing description of implementations provides illustration and description, but is not intended to be exhaustive or to limit the implementations to the precise form disclosed. Modifications and variations are possible in light of the above disclosure or may be acquired from practice of the implementations.

For example, while series of blocks have been described with regard to FIGS. 4 and 5, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method, comprising:
authenticating, by a calling device, with a network;
obtaining, by the calling device and based on the authenticating, calling security parameters;
communicating, by the calling device, the calling security parameters to a network device;
communicating, by the calling device, an identifier, corresponding to a called device, to the network device to enable the network device to associate the calling security parameters with an identifier corresponding to the calling device;

receiving, by the calling device and from the network device, a calling parameters identifier associated with the calling security parameters;

communicating, by the calling device, the calling parameters identifier to the called device;

receiving, by the calling device, a called parameters identifier from the called device in response to communicating the calling parameters identifier to the called device;

communicating, by the calling device, the called parameters identifier to the network device; receiving, by the calling device and from the network device, called security parameters in response to communicating the called parameters identifier to the network device;

creating, by the calling device, a security key based on the calling security parameters and the called security parameters; and communicating, by the calling device, with the called device using the security key.

2. The method of claim 1, where communicating with the called device using the security key, comprises:
establishing a communication session with the called device,
encrypting communications sent to the called device, and
decrypting communications received from the called device.

3. The method of claim 1, where communicating the calling parameters identifier to the called device comprises:
providing the calling parameters identifier in a session invitation message; and
communicating the session invitation message to the called device.

4. The method of claim 3, where receiving the called parameters identifier from the called device comprises:
receiving a response, that includes the called parameters identifier, to the session invitation message from the called device.

5. The method of claim 1, where:
the calling security parameters comprise at least one of:
a security parameter generated locally by the calling device;
a security parameter received from a network authentication function and associated with the calling device; or
a security parameter received from a bootstrapping authentication function and associated with the calling device.

6. The method of claim 1, wherein the called security parameter comprises at least one of:
a security parameter generated locally by the called device;
a security parameter received from a network authentication function and associated with the called device; or
a security parameter received from a bootstrapping authentication function and associated with the called device.

7. The method of claim 1, further comprising:
authenticating with the network, via a bootstrapping function, prior to obtaining the calling security parameters; and
authenticating with the network device, via a network application function, prior to communicating the calling security parameters to the network device.

8. A called device, comprising:
a processor to:
receive a calling parameters identifier from a calling device,
authenticate with a network;
obtain, based on the authenticating, called security parameters,
provide the called security parameters to a network device in response to receiving the calling parameters identifier,
communicate an identifier, corresponding to the called device, to the network device to enable the network device to associate the called security parameters with an identifier corresponding to the calling device,
receive a called parameters identifier in response to communicating the called security parameters to the network device,
provide the called parameters identifier to the calling device,
provide the calling parameters identifier to the network device,
receive calling security parameters from the network device in response to communicating the calling parameters identifier to the network device, and
produce a security key based on the called security parameters and the calling security parameters.

9. The called device of claim 8, where the processor is further to:
communicate with the calling device by:
decrypting, with the security key, information received from the calling device, and
encrypting, with the security key, information sent to the calling device.

10. The called device of claim 8, where the processor is further to:
receive the calling parameters via a session invitation message received from the calling device.

11. The called device of claim 10, where the processor is further to:
provide the called parameters identifier to the calling device by including the called parameters identifier in a response to the session invitation message received from the calling device.

12. The called device of claim 8, where:
the calling security parameters comprise at least one of:
a security parameter generated locally by the calling device;
a security parameter received from a network authentication function and associated with the calling device; or
a security parameter received from a bootstrapping authentication function and associated with the calling device.

13. The called device of claim 8, where:
the called security parameter comprises at least one of:
a security parameter generated locally by the called device;
a security parameter received from a network authentication function and associated with the called device; or
a security parameter received from a bootstrapping authentication function and associated with the called device.

14. The called device of claim 8, where the processor is further to:
authenticate with network, via a bootstrapping function, prior to obtaining the called security parameters; and
authenticate with the network device, via a network application function, prior to communicating the called security parameters to the network device.

15. One or more non-transitory computer-readable storage media, comprising:
one or more instructions that, when executed by a processor of a network device, cause the processor to:
receive calling security parameters from a calling device, receive an identifier, corresponding to a called device, from the calling device, associate the identifier with the calling security parameters, authenticate the called device, based on the identifier, associate the calling security parameters with a calling parameters identifier, communicate the calling parameters identifier to the calling device in response to receiving the calling security parameters from the calling device, receive the calling parameters identifier from the called device, identify the calling security parameters associated with the calling parameters identifier, communicate the calling security parameters to the called device in response to receiving the calling parameters identifier, receive called security parameters from the called device, associate the called security parameters with a called parameters identifier, communicate the called parameters identifier to the called device in response to receiving the called security parameters from the called device, receive the called parameters identifier from the calling device, identify the called security parameters based on the called parameters identifier, and communicate the called security parameters to the calling device in response to receiving the called parameters from the calling device, the calling security parameters and the called security parameters being used to create security keys.

16. The computer-readable storage media of claim 15, further comprising:

one or more instructions that, when executed by the processor of the network device, cause the processor to:

authenticate the calling device with respect to a communication service corresponding to the network device prior to associating the calling security parameters with the calling parameters identifier.

17. The computer-readable storage media of claim 15, further comprising:

one or more instructions that, when executed by the processor of the network device, cause the processor to:

authenticate the called device with respect to a communication service corresponding to the network device prior to associating the called security parameters with a called parameters identifier.

18. The computer-readable storage media of claim 15, wherein the calling security parameters comprise at least one of:

a security parameter generated locally by the calling device;

a security parameter received from a network authentication function and associated with the calling device; or a security parameter received from a bootstrapping authentication function and associated with the calling device.

19. The computer-readable storage media of claim 15, wherein the called security parameter comprises at least one of:

a security parameter generated locally by the called device;

a security parameter received from a network authentication function and associated with the called device; or a security parameter received from a bootstrapping authentication function and associated with the called device.

20. The computer-readable storage media of claim 15, further comprising:

one or more instructions that, when executed by the processor of the network device, cause the processor to:

store the called security parameters after receiving the called security parameters from the called device.

\* \* \* \* \*